United States Patent Office 3,848,063
Patented Nov. 12, 1974

3,848,063
PROCESS FOR THE MANUFACTURE OF HIGH-PURITY LITHIUM HEXAFLUOROARSENATE
Raybon C. Cannon, Tucker, and Robert A. Wiesboeck, Stone Mountain, Ga., assignors to United States Steel Corporation
No Drawing. Filed Aug. 16, 1973, Ser. No. 389,602
Int. Cl. C01b 27/00; C01d 11/02
U.S. Cl. 423—464
6 Claims

ABSTRACT OF THE DISCLOSURE

Lithium hexafluoroarsenate is purified and separated from other products of the neutralization of hexafluoroarsenic acid with lithium hydroxide, by heating the neutralization product in the presence of an excess of lithium hydroxide, adjusting the pH to between 7.5 and 9, and filtering to remove the precipitated impurities. The product may be crystallized by cooling of the filtrate, separated and vacuum-dried with an auxiliary dry gas sweep.

BACKGROUND OF THE INVENTION

The preparation of lithium hexafluoroarsenate $(LiAsF_6)$ can be accomplished in a number of ways as recently listed by E. W. Lawless, Inorganic Chemistry, No. 10, Nov. 5, 1971, pp. 1085–1086. The most practical and economical method is the neutralization of hexafluoroarsenic acid ($HAsF_6$) with lithium hydroxide (LiOH):

$$HAsF_6 + LiOH \rightarrow LiAsF_6 + H_2O$$

Since hexafluoroarsenic acid always contains some lower fluoroarsenic acids such as $HAsF_5OH$, $HAsOF_4$, $HAsO_2F_2$, $H_2AsO_3F$, and hydrogen fluoride (HF) as equilibrium species, the neutralization product requires additional purification, which is in the conventional method carried out by multiple recrystallization from water or a suitable organic solvent.

A preferred process for making lithium hexafluoroarsenate is disclosed in U.S. Pat. 3,654,330 to Wiesboeck.

A high purity product is required for use of the lithium hexafluoroarsenate in high-energy storage batteries. By high purity, we mean that the product should contain at least 99.5% $LiAsF_6$, and no more than 0.025% moisture.

SUMMARY OF THE INVENTION

This disclosure describes a method for preparing high-purity lithium hexafluoroarsenate suitable for application as an electrolyte in high-energy batteries. The process involves neutralization of hexafluoroarsenic acid with lithium hydroxide, followed by heating of the formed lithium hexafluoroarsenate solution with more lithium hydroxide to convert impurities to water-insoluble materials which are removed by filtration. Then the pH of the solution is adjusted with hydrogen fluoride to 7.5–9, preferably 8.5. The hot solution is stored to complete the precipitation of insoluble materials, filtered, and cooled to crystallize the product as the trihydrate, $LiAsF_6 \cdot 3H_2O$.

Dehydration of the product is carried out at temperatures not exceeding 100° C. preferably 60–70° C. The temperature limitation is important for the preparation of an electrochemical-grade product since acidic decomposition products begin to form above 75° C.

The drying is continued in vacuum, preferably with a dry sweep gas, till the moisture level is reduced to 0.02 percent or less.

Further drying and purification is achieved by dissolving the product in an organic solvent such as an ester or ether, and drying it with a suitable drying agent such as lithium hydride, calcium hydride, metallic lithium, or molecular sieves. After stirring the mixture for several hours, and filtering, the product is obtained as a solution, and may be used as such or crystallized by concentrating in vacuum.

Conventional procedures for the preparation of electrochemical-grade lithium hexafluoroarsenate employ multiple recrystallization to eliminate the impurities with the mother liquor. However, because of the high solubility of lithium hexafluoroarsenate in water (1.9 grams per milliliter of water at 25° C.), washing of the crystallized product imposes a prohibitively high loss. Without washing, the impurity rejection of the recrystallization method is inefficient and rather wasteful.

We have developed an improved method which is based on converting all impurities to water-insoluble compounds by prolonged heating of the product with excess lithium hydroxide. The precipitated impurities can then be removed efficiently by a simple filtration of the hot solution. A minimum base concentration to give a pH of 10.5 or higher is required for a satisfactory action. In this manner, impurities are eliminated permanently from the process streams. No buildup of detrimental contaminants is encountered as compared to the problematic impurity accumulation of the recrystallization approach, where recycling of the mother liquor invariably accumulates the soluble impurities, making subsequent recrystallizations less and less efficient.

This new method utilizes the difference in the rate of base-catalyzed hydrolysis of the various fluoroarsenate salts to achieve the purification. Since hexafluoroarsenate is the most stable fluoroarsenate species in base, prolonged heating will eventually convert all fluoroarsenates other than hexafluoroarsenate to water-insoluble lithium fluoride and lithium arsenate.

An additional advantageous effect of the base treatment is the improved thermal stability of the product. Generally, samples of lithium hexafluoroarsenate not exposed to the base treatment turn acidic on heating to 50–65° C. However, the base treatment eliminates unstable impurities more efficiently than conventional recrystallization, and drying temperatures can be raised to 75–80° C. without forming acidic decomposition products.

The duration of the base treatment varies with the quality of the hexafluoroarsenic acid from which the lithium hexafluoroarsenate was prepared. Generally, three to ten days at 80–100° C. are required to hydrolyze all by-product fluoroarsenates. Heating for 15 days or more is not detrimental. For practical purposes, it is advantageous to combine the base treatment with the acid neutralization and the subsequent concentration step in the following manner.

Contrary to the practice common in the prior art, the hexafluoroarsenic acid, as solid hydrate or aqueous solution, is added with vigorous agitation to an excess lithium hydroxide solution, thereby maintaining a strongly basic medium at all times, i.e., pH at least 10.5. This procedure not only promotes the decomposition of byproducts right from the beginning of the neutralization but prevents the formation of additional byproduct from hexafluoroarsenate which occurs rapidly in an acid medium.

The heat of reaction is utilized to raise the temperature to 80–100° C. The initial precipitate of lithium fluoride and other insoluble byproducts, resulting from the hydrogen fluoride content and other equilibrium species, of the hexafluoroarsenic acid may be filtered off or left in the product solution, depending on the quantity, during the subsequent base treatment. The solution or slurry is maintained at 80–100° C. while adding lithium hydroxide to hold the pH above 10.5. After three to four hours, a sample is taken and titrated with acid to determine the lithium hydroxide concentration. The base treatment is completed as soon as the consumption of lithium hydroxide is less than 0.5 millimoles per liter per day. The pH may reach as high as 11.5, but is preferably held at 11.

At this point the hot solution is filtered and aqueous hydrogen fluoride added to reduce the basicity to a pH of 7.5–9.0, preferably 8.5. After storage for a time sufficient to complete the precipitation of the neutralization products, the hot slurry is filtered, cooled to 25° C., and the precipitated product collected on a filter. Adhering liquid is allowed to drain off thoroughly. Storage time for precipitation will usually be no longer than about three hours.

The product, containing three moles of water of hydration, is dried at atmospheric or under reduced pressure at 50–75° C., preferably 60–70° C., with the provision for a dry-gas sweep. This reduces the moisture content to that corresponding to the monohydrate, 8–9 percent. Vacuum drying, combined with a dry-gas sweep, removes additional moisture to 0.02 percent or less. Any dry gas inert to the reaction mixture may be used. We prefer to use nitrogen at a rate, measured at normal atmospheric pressure, of 20–30 ml. per hour per kilogram of $LiAsF_6$. Any other dry, inert gas such as air, for example, may be used at the same rate.

The choice of drying temperature is critical since acidic decomposition products are formed if certain temperature limits are exceeded. These limits are dependent on the purity level of the product; base-treated samples of lithium hexafluoroarsenate may be heated to 75° C. without formation of acidic decomposition products. The presence of acidic contaminants in lithium hexafluoroarsenate is particularly detrimental in applications in batteries. Even trace quantities, not detectable by conventional elemental analysis, interfere with the long-term stability of the electrolyte. A very sensitive method to detect acidic contaminants is the pH check of an aqueous solution of the product. Pure lithium hexafluoroarsenate gives aqueous solutions with a pH of 6.8–7.0. By contrast, most conventional anhydrous lithium hexafluoroarsenate yields acidic aqueous solutions of pH 3–4, indicating the presence of acidic or acid-forming contaminants.

The product obtained according to the method of this invention gives pH values from 6.5–7.0. After drying to 0.02 percent moisture as described, the material may be dissolved in an equal weight of anhydrous methyl formate or other suitable solvents such as methyl acetate or propylene carbonate. The moisture content of the solution is further reduced by treatment with a strong desiccant such as lithium hydride, calcium hydride, metallic lithium, or molecular sieves.

After the desired degree of dryness is reached, typically 10–15 parts per million moisture, insoluble material is removed by filtration. The product solution is used as such or concentrated by evaporation under reduced pressure to crystallize high purity lithium hexafluoroarsenate.

Example I

Hexafluoroarsenic acid in the form of the solid hexahydrate, $HAsF_6 \cdot 6H_2O$ (8.300 kilograms) was added gradually to a stirred, warm solution of lithium hydroxide monohydrate (1.000 kilograms) in 4.0 liters of water. As soon as one-third of the acid had been added, additional lithium hydroxide monohydrate (1.300 kilograms) was fed simultaneously with the acid to the reaction mixture. The heat of neutralization raised the temperature to 60–80° C. Addition of the reactants was completed within three hours. The resulting slurry was maintained at 80–100° C. for five days. Consumed base, as indicated by periodic titration of a sample, was replaced with additional lithium hydroxide to maintain a pH of 11 or higher. Heating was discontinued when the rate of base consumption required to maintain the pH at 11 or higher decreased to 0.5 millimoles per liter per day. The slurry was filtered, adjusted with hydrofluoric acid to pH 8.5, stirred for three more hours, and filtered while hot. The filter cake (1.12 kilograms dry weight) was washed with 2 liters of hot water and the washings saved for subsequent runs. Cooling of the filtrate to 0° C. precipitated 3.728 kilograms of lithium hexafluoroarsenate trihydrate, $LiAsF_6 \cdot 3H_2O$, which was dried for four days at 60–65° C. in vacuum with a dry-nitrogen sweep. The material contained 0.035 percent moistre as determined by the Karl Fischer method. A 1-molar aqueous solution showed a pH of 6.9.

The product (1.756 kilograms) was dissolved in an equal weight of anhydrous methylformate while cooling, and passed through a column of Linde Molecular Sieves Type 3A which reduced the moisture content of the solution to 0.005 percent. Atmospheric moisture was excluded by a stream of dry nitrogen.

A portion of the solution was evaporated at 20–30° C. under reduced pressure to a thick slush. Filtration under reduced pressure and drying of the crystal cake gave high-purity lithium hexafluoroarsenate with a moisture content of 0.006 percent. A 1-molar aqueous solution had a pH of 6.7.

Example II

A solution of hexafluoroarsenic acid (8.345 kilograms, 38.1 percent $HAsF_6$) was neutralized with lithium hydroxide (2.225 kilograms) as described in Example I. Insoluble material (1.577 killograms, dry weight) was filtered off while hot, and the filtrate heated to 80–100° C. for thirteen days while maintaining the lithium hydroxide concentration at a level equivalent to pH 11.0–11.5. The solution was allowed to concentrate by evaporation during the heating period until a density of 1.80 was reached. Excess base was neutralized with hydrofluoric acid to pH 8.6. After storage for three hours, precipitated material was removed by filtration. Cooling to 5° C. precipitated the trihydrate of lithium hexafluoroarsenate (3.298 kilograms) which was dried at 60° C. at atmospheric pressure for four days, reducing the water content to 8 percent. Subsequent drying in vacuum (0.1 millimeter. 70° C.) with a sweep of dry nitrogen for five more days gave a product with 0.03 percent moisture, pH 6.8. The material (2.418 kilograms) was dissolved with cooling in an equal weight of anhydrous propylene carbonate and stirred with lithium hydride for two days. Filtration yielded a product solution with a moisture content of 0.003 percent. Dilution of a sample with 10 parts of water gave pH of 6.5.

Thus, it will be seen that our invention includes a mode of neutralization which minimizes byproduct formation and provides conditions favorable for high yields, elimination of detrimental impurities by chemical means instead of conventional recrystallization, conversion of impurities to insoluble materials which can be separated by a simple and efficient filtration as compared to the recrystallization method, permanent elimination of impurities from process recycle streams, thereby avoiding accumulation, and drying of the product within certain temperature limits in combination with a dry sweep gas to prevent hydrolysis as monitored by pH checks of aqueous solutions.

The application of base treatment under rigorous conditions (80–100° C., pH 11) achieves the complete decomposition of detrimental impurities in an economical way.

We do not intend to be restricted to the above specific examples and description of our invention. It may be otherwise variously practiced within the scope of the following claims:

We claim:

1. Method of purifying lithium hexafluoroarsenate comprising adding impure lithium hexafluoroarsenate containing as impurities $HAsF_5OH$, $HAsOF_4$, $HAsO_2F_2$, $H_2AsO_3F$ and HF to aqueous lithium hydroxide, heating the mixture to 80–100° C. to cause decomposition and precipitation of impurities, adding to the mixture lithium hydroxide to maintain the pH thereof at least at 10.5 and to cause further decomposition and precipitation of impurities, thereafter reducing the pH to from 7.5 to 9.0 by adding HF, separating the precipitates from the lithium hexafluoroarsenate, cooling the liquid thereform to 0–25° C. to precipitate lithium hexafluoroarsenate trihydrate, and drying the lithium hexafluoroarsenate under vacuum at a temperature not exceeding 100° C. and with a dry inert sweep gas.

2. Method of claim 1 in which lithium hydroxide is added to maintain the pH at least at 10.5 until the consumption of lithium hydroxide is less than 0.5 millimoles per liter of solution per day.

3. Method of claim 1 in which the basicity after decomposition of the impurities is adjusted to about pH 8.5.

4. Method of claim 1 in which the drying step is performed at a temperature from 60 to 70° C.

5. Method of claim 1 in which the drying step is continued to reduce the moisture content of the lithium hexafluoroarsenate to less than 0.02 percent.

6. Method of claim 1 in which the dry sweep gas is nitrogen and it is employed to dry the lithium hexafluoroarsenate at a rate of 20–30 ml. (measured at normal atmospheric pressure) per hour per kilogram of $LiAsF_6$.

References Cited

UNITED STATES PATENTS 3,655,332   4/1972   Smith, Jr. _____ 423—464

EDWARD STERN, Primary Examiner

U.S. Cl. X.R.

23—302, 305